US011073971B2

(12) United States Patent
Skarda et al.

(10) Patent No.: US 11,073,971 B2
(45) Date of Patent: Jul. 27, 2021

(54) SYSTEM AND METHOD FOR GENERATING A CUSTOMIZED USER INTERFACE COMPRISING MOVABLE MODULES BY PRIORITIZING PERSONAS OF A USER

(71) Applicant: PAYPAL, INC., San Jose, CA (US)

(72) Inventors: Bryant Louis Skarda, Mountain View, CA (US); Runar Gudbjartsson, San Jose, CA (US); Suraj Powar, San Jose, CA (US); Erica Ware, Santa Clara, CA (US); David Lin, Saratoga, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 16/052,579

(22) Filed: Aug. 1, 2018

(65) Prior Publication Data

US 2020/0042158 A1 Feb. 6, 2020

(51) Int. Cl.
*G06F 3/0484* (2013.01)
*G06F 3/0482* (2013.01)
*G06F 3/0488* (2013.01)

(52) U.S. Cl.
CPC ........ *G06F 3/04845* (2013.01); *G06F 3/0482* (2013.01); *G06F 3/04883* (2013.01)

(58) Field of Classification Search
CPC .. G06F 3/0482; G06F 3/0483; G06F 3/04845; G06F 3/04883; G06F 9/451; G06F 3/0481; G07F 19/206; G07F 9/0235; G07G 1/01
See application file for complete search history.

(56) References Cited

U.S. PATENT DOCUMENTS

| D623,655 S | 9/2010 | Jewitt et al. |
|---|---|---|
| D771,654 S | 11/2016 | Chaudhri et al. |
| D775,632 S | 1/2017 | van den Berg et al. |
| 9,547,854 B2 | 1/2017 | Serrano |
| D785,012 S | 4/2017 | Jou |
| D790,578 S | 6/2017 | Hatzikostas |
| D819,646 S | 6/2018 | Jow et al. |
| D821,440 S | 6/2018 | Li et al. |
| D822,689 S | 7/2018 | Amidei et al. |
| D822,690 S | 7/2018 | Amidei et al. |
| D831,041 S | 10/2018 | Anton et al. |
| D837,815 S | 1/2019 | Biberger et al. |
| D841,024 S | 2/2019 | Ciediere et al. |
| D842,871 S | 3/2019 | Ciediere et al. |
| D842,888 S | 3/2019 | Krainer et al. |
| D842,889 S | 3/2019 | Krainer et al. |
| D847,146 S | 4/2019 | Hilhorst et al. |

(Continued)

*Primary Examiner* — Abdullah Al Kawsar
*Assistant Examiner* — Kenny Nguyen
(74) *Attorney, Agent, or Firm* — Haynes and Boone, LLP

(57) ABSTRACT

Aspects of the present disclosure involve systems, methods, devices, and the like for presenting a user interface. In one embodiment, a system and method is introduced that enables the customization of a user interface on a mobile application. The customized user interface is generated in response to a user interaction with the mobile application. In another embodiment, a system and method are introduced which generate the customized user interface including modules used to present a customized layout created using tiles which are presented on the user interface, wherein each of the tiles are placed and customized specific to the user of the mobile device application.

20 Claims, 8 Drawing Sheets

(56) References Cited

U.S. PATENT DOCUMENTS

| | | | |
|---|---|---|---|
| 10,360,554 B2 | 7/2019 | Mercille | |
| 2002/0098840 A1 | 7/2002 | Hanson et al. | |
| 2011/0231878 A1* | 9/2011 | Hunter | H04N 5/44543 |
| | | | 725/48 |
| 2011/0258049 A1* | 10/2011 | Ramer | G06Q 30/0273 |
| | | | 705/14.66 |
| 2013/0072153 A1 | 3/2013 | Lawson et al. | |
| 2013/0185285 A1 | 7/2013 | Shuman et al. | |
| 2015/0006258 A1* | 1/2015 | Salama | G06Q 30/0282 |
| | | | 705/7.35 |
| 2015/0052121 A1* | 2/2015 | Sharifi | G06F 16/489 |
| | | | 707/723 |
| 2015/0087303 A1* | 3/2015 | Hillary | H04W 48/04 |
| | | | 455/435.1 |
| 2015/0128020 A1 | 5/2015 | Chavez et al. | |
| 2015/0278917 A1* | 10/2015 | Stoll | G06Q 50/01 |
| | | | 705/26.7 |
| 2015/0370981 A1* | 12/2015 | Nuckolls | G16H 50/20 |
| | | | 705/2 |
| 2016/0232600 A1* | 8/2016 | Purves | G06Q 30/0641 |
| 2016/0357366 A1* | 12/2016 | Migos | G06F 3/0482 |
| 2017/0013103 A1 | 1/2017 | Jokobsen et al. | |
| 2017/0324871 A1* | 11/2017 | Soini | H04M 7/0012 |
| 2017/0337561 A1* | 11/2017 | Curtis | G06F 16/2457 |
| 2018/0007148 A1* | 1/2018 | Nielsen | H04L 67/306 |
| 2018/0067641 A1 | 3/2018 | Lerner et al. | |
| 2018/0188945 A1* | 7/2018 | Garmark | G06F 3/0485 |
| 2018/0330363 A1* | 11/2018 | Paek | G06Q 20/3223 |
| 2019/0026313 A1* | 1/2019 | Zhang | G06F 16/5838 |
| 2019/0095436 A1* | 3/2019 | Martinazzi | G06T 11/60 |

\* cited by examiner

SYSTEM AND METHOD FOR GENERATING A CUSTOMIZED USER INTERFACE COMPRISING MOVABLE MODULES BY PRIORITIZING PERSONAS OF A USER

TECHNICAL FIELD

The present disclosure generally relates to a user interface on a mobile computing device and more specifically, to systems and methods for generating a customized user interface on a mobile computing device.

BACKGROUND

Rapid advancements in technology and communications have led to the ubiquitous use of wireless electronics. As such, today's society has grown to become heavily device reliant. This reliance has led to the use of electronics to make monetary transactions for goods and services, for use in telecommunications, business and other electronic activities. For example, a smartphone may now be used to complete a purchase transaction at an online marketplace or at a merchant location while using an application on the smartphone. Typically, a user may interact with a mobile application which has been designed and functions based on a standard hardcoded application which will provide all users of the mobile application the same user interface design or layout and the users must therefore interact with the application in the same way. Unfortunately, in some instances, this type of design may be unnecessarily rigid and does not take the different needs of different users into account. Therefore, it would be beneficial if a system were created that be configured to generate and display an application user interface that is specifically customized for the user.

Figure 1:
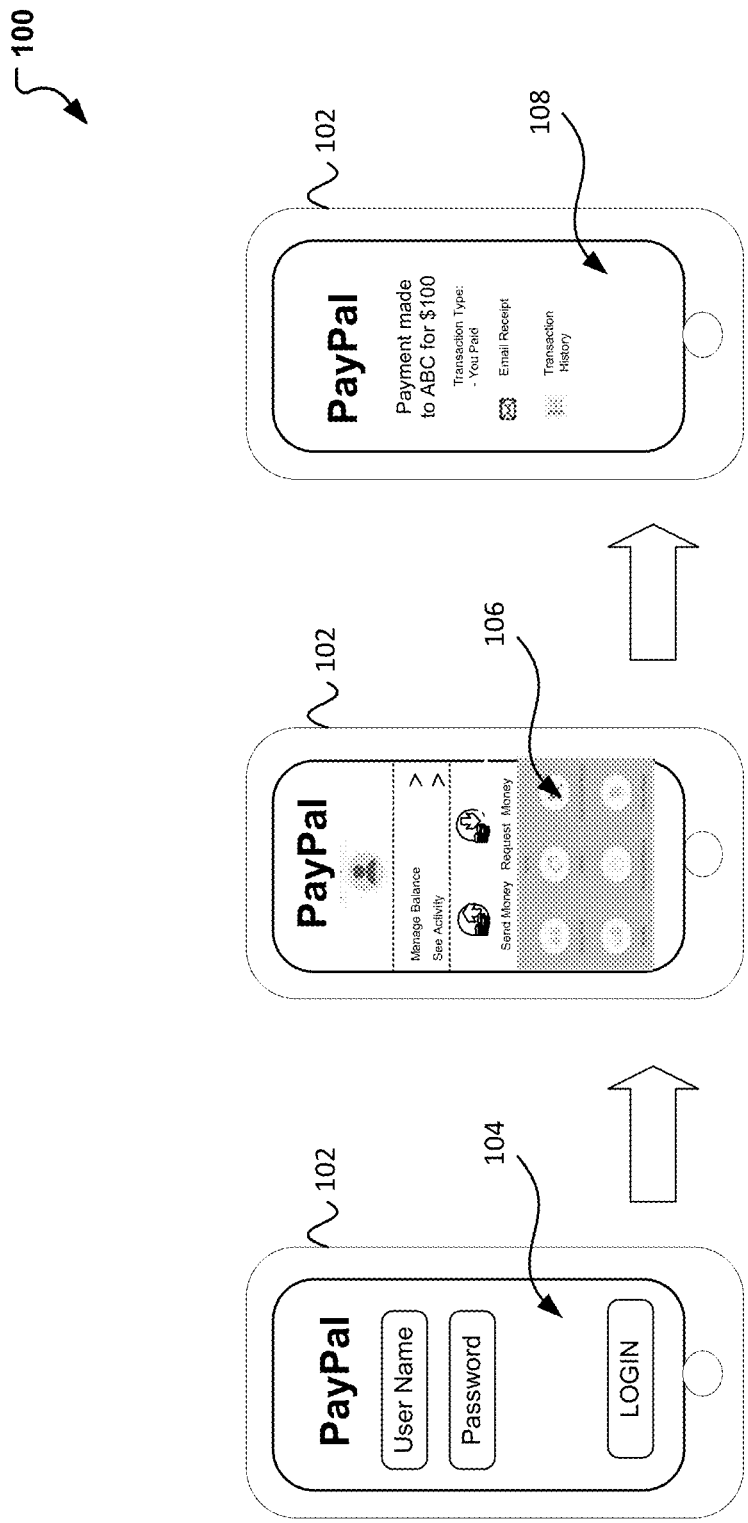
FIG. 1 illustrates block diagrams of a user interactions with a user interface on a user device.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for presenting a user interface. In one embodiment, a system and method is introduced that enables the customization of a user interface on a mobile application. The customized user interface is generated in response to a user interaction with the mobile application. In another embodiment, a system and method are introduced which generate the customized user interface including modules used to present a customized layout created using tiles which are presented on the user interface, wherein each of the tiles are placed and customized specific to the user of the mobile device application.

Rapid advances in communications have made portable electronic devices, such as smartphones and tablets, part of everyday life. Among other things, these electronic devices can be used to browse the web, stream video, and purchase goods and services. However, in some instances a mobile application is used to perform these functions.

For example, a user may download a standard mobile application on the mobile device which presents an interface for interacting with the application. Conventionally, however, the mobile applications may have fixed user interfaces, where the layout of the user interface is "hard coded" into the mobile application. For example, the mobile application (running on the mobile device) itself may contain all the information necessary to configure and/or display a user interface layout, and that layout remains the same not only for the same user, but also for different users as well. As such, conventional mobile applications generally have a "one-size-fits-all" type of user interface design, which unfortunately does not account for the different needs among different users, or even the changing needs of the same user depending on the circumstances.

FIG. 1, illustrates this conventional method, where a user is interacting a third-party service provider for transacting. In particular, FIG. 1 illustrates a user interacting with a user device 102 for performing one or more transactions. The user device 102 may be a tablet, iPad, cell phone, mobile device, smartphone or the like. For exemplary purposes, user device 102 can be a mobile device 102. The mobile device 102 may be equipped with various applications for performing various tasks including web browsing, video streaming, bill payments, and online purchases, etc. Additionally, the mobile device 102 may be equipped with applications that enable the user to make purchases using a payment provider application and/or a digital wallet. Further, the user device 102 is capable of making phone calls and communicating with one or more other communications devices using a cellular network, Wi-Fi, Bluetooth, BLE, NFC, WLAN, etc. The communication can enable the transmission of information from a user account to a secondary source, making payments, or communicating with a server associated with an application of the mobile device 102. For example, FIG. 1 illustrates a user interacting with a user interface associated with a payment provider (e.g., PayPal) wherein the interaction begins with a user authentication via a credential user interface 104 on the mobile device 102. The user authentication can be a standard authentication which can be designed to enable entering a user name and passcode. Additionally or alternatively, user biometrics, voice commands, 2-factor authentication, etc. may also be used as a credential user interface 104.

Further to the authentication, the mobile application can present a standard home user interface 106 on a screen of the mobile device 102. Notice that on this home user interface 106, a standard design and functionally is presented. For example, for this particular mobile application, the third-party payment provider presents the user with a general home user interface 106, wherein the user picture may be displayed, sent/payment requests may be sent, and other functions including but not limited to accessing money pools, offers, placing orders, investing and donating are presented. Notice that although various functions are available for a user. A first user accessing the third-party payment provider will be presented with the same general home user interface 102 as a second user also interacting with the same third-party payment provider application. That is to say, for example if Mary logs into her PayPal account and John does as well, both Mary and John will be presented with the same user interface (e.g., home screen) with the option to send and request funds, and access moneypools, offers, donate all in a similar fashion. Likewise, a payment request and/or payment made will be presented as illustrated in payment user interface 108, with a standard layout amount and functionality. Thus, the design and function of the application on the mobile device has been hard-coded and does not account for the different needs among different users, or even the needs of the same user depending on the circumstances.

As such, a new embodiment is presented to overcome this problem by providing a user interface that is customized for the different users, based on user circumstance, and/or as a user's needs and interactions with an application change. Therefore, in contrast to conventional mobile applications where the user interface design is "hard coded" into the mobile application itself, the mobile application of the present disclosure communicates with a remote server and displays a dynamically configured user interface under instructions sent from the server.

For example, the server analyzes the user's profile, behavior, and/or the context in which the user is requesting the interaction with the mobile application. Based on the analysis, the server determines which user interface elements would be appropriate or suitable for that user under the circumstances. The server then sends instructions to the mobile application on how to display the user interface, which is customized to that specific user's profile, behavior, and/or the context or environment surrounding the user. In doing so, the present disclosure improves the functionality of a computer, for example by enhancing the versatility and contextual-awareness of a generic mobile device. Further, due to the small screen sizes on mobile devices, as compared with desktop monitors, a static or "one-size-fits-all" display may omit content that may be important to a user, as more fundamental or universal content may take up the limited display area. With a larger screen, more content may be displayed, such that a higher likelihood exists that a user may find desirable content on the display, even though the same content is displayed to everyone. Thus, the solution, in some embodiments, addresses a technical problem specific to mobile computing devices with smaller user interfaces, such as smart phones. The various aspects of the present disclosure are discussed in more detail with reference to FIGS. 1-8.

Figure 2:
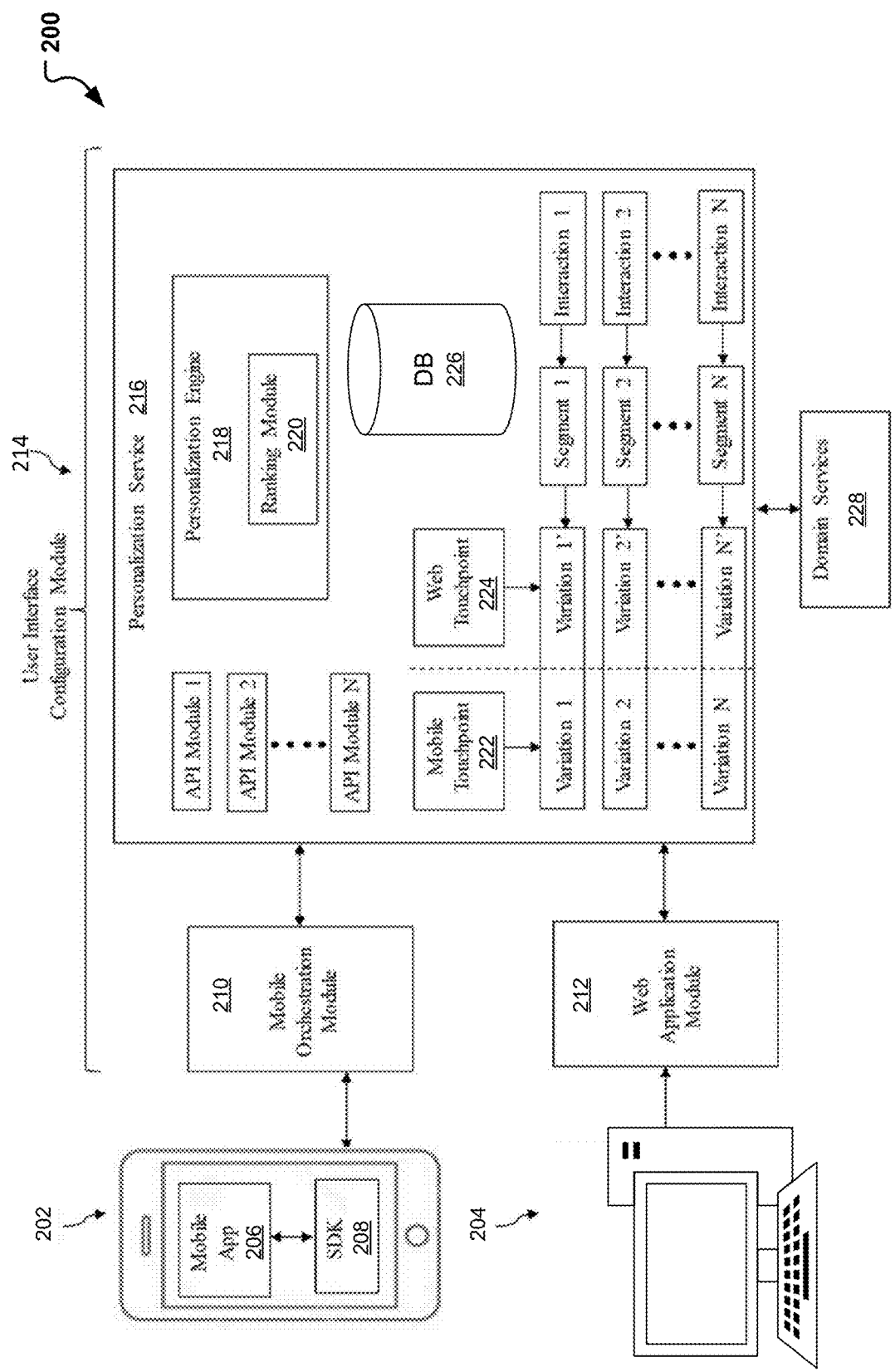
FIG. 2 illustrates a block diagram of a system for generating and rendering customized user interfaces according to various aspects of the present disclosure.

Turning to FIG. 2, a block diagram is presented of a system 200 for generating and rendering customized user interfaces according to various aspects of the present disclosure. In particular, FIG. 2 is a simplified block diagram illustrating the contents of a user interface configuration module 214 and how it interacts with certain user devices 204,204. For example, one type of user device may be a mobile device 210, which may be an embodiment of the mobile device 102 discussed above in association with FIG. 1. In various embodiments, the mobile device 202 may be a smartphone such as the Apple™ iPhone™ or a table computer such as the Apple™ iPad™. Another type of user device may be a computer 204, for example a desktop computer or a laptop computer running a non-mobile operating system, such as Windows™ by Microsoft™, or MacOS™ by Apple™. The mobile device 202 communicates with the user interface configuration module 214 via a mobile orchestration layer 210 of the user interface configuration module 214, whereas the computer 204 communicates with the user interface configuration module 214 via a web application module 212 of the user interface configuration module 214. The subsequent sections of the present disclosure will focus on the interaction between the mobile device 202 and the user interface configuration module 214, though the interaction between the computer 204 and the user interface configuration module 214 may be briefly discussed as well.

As shown in FIG. 2, a mobile application 206 is installed on the mobile device 202. The mobile application 202 may be an embodiment of a browser, a toolbar application, a communication application, other applications, or a payment application as discussed above in association with FIG. 1. As non-limiting examples, the mobile application 206 may be an application directed to online/offline gaming, social media, electronic transactions, web browsing, media consumption, productivity management, mobile banking, file storage, file editing, E-learning, etc. Each type of mobile application 206 may have a respective user interface that allows a user to interact with the mobile application 206. Whereas conventional mobile applications have rigid and fixed user interfaces, the mobile application 206 has a dynamically changing user interface that is customized to the particular user, depending on the context surrounding the use of the mobile application 206.

The mobile device 202 also has a software development kit (SDK) 208 installed thereon. The SDK 208 may include a set of software development or programming tools, such as application programming interfaces (APIs), libraries, documentation, etc. In some embodiments, the mobile application 206 may communicate with the user interface configuration module 214 via the SDK 208. For example, the mobile application 206 may communicate with the mobile orchestration module 210 via the SDK 208. In that regard, the mobile orchestration layer 210 orchestrates calls on behalf of the mobile application 206. For example, for the mobile application 206 to render a user interface, it may make calls to any one of the API module 1 through API module N that resides on a personalization service component 216 of the user interface configuration module 214. Each of the API modules 1-N may provide a particular functionality or may correspond with a specific part of the user interface of the mobile application. For example, API module 1 may allow the user interface to display an account balance tile, API module 2 may allow the user interface to display a user activity tile, and API module N may allow the user interface to display an account quality tile, etc. The tiles are dynamically configured user interface elements that will be discussed in more detail below with reference to FIG. 3.

Still referring to FIG. 2, oftentimes the mobile application 210 may need to make a plurality of API calls to the API modules 1-N in order to render the user interface of the mobile application 206. Rather than having the mobile application 206 make these API calls individually (e.g., one at a time)—which would be slow (e.g., long latency periods between the calls) and increase battery drain—the mobile orchestration layer 210 orchestrates all these API calls into a single API call and communicates with all the relevant API modules. After getting responses from the API modules that were called, the mobile orchestration layer 210 then returns a comprehensive result of the API calls back to the mobile application 206 altogether. In doing so, the mobile orchestration layer 210 not only reduces the latency of the mobile application 206, but also enhances the battery life of the mobile device 202, thereby improving the computer functionality of the mobile device 202.

In addition to the API modules 1-N, the personalization service 216 may also define variations, segments, and interactions, in order to provide a personalized user interface layout for the user. In that regard, a variation may refer to a user interface element that the user can see on the screen of the mobile 202. As an example, such a user interface element may be a movable tile or icon that indicates the amount of monetary balance available for a user (e.g., $10). As another example, another user interface element (that may constitute a variation) may be a card or notification that states "User X needs money."

As shown in FIG. 2, the personalization service 216 may define a plurality of variations: variations 1 through variations N, to specify all of the different user interface elements that can be displayed on the screen of the mobile device 202. It is understood that in some embodiments, the variations may be common for both the mobile platform and the web platform. In other words, each variation may be defined the same in the mobile application 206 as well as in a web browser used by the computer 204 to communicate with the user interface configuration module 214, where the web browser on the computer 204 may implement substantially similar (though not necessarily identical) functionalities as the mobile application 206 running on the mobile device 202. For ease of reference, the variations 1 through N corresponding to the mobile platform are labeled herein as variations 1' through N' corresponding to the web platform.

In some embodiments, the variations 1 through N of the mobile platform may be accessed via a mobile touchpoint 222, whereas the variations 1' through N' of the web platform may be accessed via a web touchpoint 224. The mobile touchpoint 222 and the web touchpoint 224 may each include an API call, for example in the form of one of the API modules 1-N discussed above. If a variation needs to be accessed by the mobile application 206 via the mobile device 202, the mobile application 206 makes a call (e.g., through the SDK 208) to the mobile touchpoint 222. If a variation needs to be accessed by the web browser via the computer 204, the web browser makes a call (e.g., through the web application module 212) to the web touchpoint 224. It is understood that although the mobile touchpoint 222 and the web touchpoint 224 are illustrated as residing on the server (e.g., as a part of the personalization service 216), they may alternatively be implemented on the mobile device 202 or the computer 212, respectively.

Still referring to FIG. 2, each of the variations 1-N may be assigned to one or more segments 1-N. Each of the segments 1-N may define a persona or profile shared by a certain type of users, as well as the type of user interface experience that should be provided for such a type of users. For example, a persona or profile may refer to users who are new users who have just registered to be a user for the mobile application 206. These new users have not made any transactions via the mobile application 206. As such, it may be beneficial to promote a certain type of transaction to these users. For example, to encourage these new users to use the mobile application 206 to conduct electronic transactions, the segment 1 may specify that, for a user who has been determined to be a new user, the variation 1 should display a "send money" tile that informs the user that he/she can send funds electronically to another person via the mobile application 206 by clicking on the tile.

In some embodiments, in order to determine which segment a particular belongs, the personalization service 216 extracts user data from the mobile device 202 and analyzes the extracted user data. For example, as a part of the initiation registration to use the mobile application 206, the user may provide biographical data such as age, gender, ethnicity, address, employer, occupation, education, income, citizenship, hobbies, interests, goals, sexual orientation, relationships, etc. The biographical data may be sent back to the personalization engine and/or may be stored in an electronic database 226, which may be implemented as a part of the personalization service 216 or may be implemented as a separate entity from the personalization service 216.

As another example, the personalization service 216 may instruct the mobile application 206 to periodically monitor a Global Positioning System (GPS) sensor of the mobile device 202. The GPS sensor may provide the GPS coordinates of the mobile device 202, which in turns allows the mobile application to determine the geographical locations of the mobile device 202 (and thus its user). The geographical locations are then fed back to the personalization service 216, for example via the mobile orchestration module 210 or via another suitable communication module.

As yet another example, the mobile application 206 may monitor the habits of the user. The user habits may be related to financial transactions, which may include the types of products/services frequently purchased by the user, the merchants or service providers that offer the purchased products/services, the price range of the purchased product/services, the times of the day, week, month, or year in which the purchases typically occur, etc. The user habits may also be related to the user's social life, for example the identity of other users with whom the user often interacts.

Over time, the personalization service 216 may gather enough data about the user of the mobile application 206 so as to determine which segment or segments the user belongs. For example, the personalization service 216 may determine that the user is someone who in a young man in his mid-20s, with a college education and has a job with a six figure salary at an engineering firm, who is currently single but is actively dating. The personalization service 216 may also determine that the user has hobbies that include snowboarding, basketball, and hiking, as well as interests in international travelling, digital photography, and French cuisine. In addition, the personalization service 216 may determine that the user prefers to shop online as opposed to shopping at brick-and-mortar stores.

In some embodiments, the personalization service 216 may have a predefined segment for each of the above traits or behaviors of the user. For example, a segment may be defined to include all users who are in their mid-20s, another segment may be defined to include all users who shops at a particular online merchant, and yet another segment may be defined to include all users who enjoy snowboarding. Alternatively, each segment may be defined to encompass several traits or behaviors of the user. For example, a segment may be defined to include users that are in their mid-20s with a job paying a salary above a predefined threshold, like to shop at one or more particular online merchants, and enjoy snowboarding and dining out frequently. In some other embodiments, the personalization service 216 may also specifically define one or more segments to accurately capture the user's traits or behavior, if existing segments cannot describe such user information adequately.

The personalization service 216 may also specify a plurality of interactions 1-N for the segments 1-N, respectively. In that regard, an interaction may include a rule that specifies how each segment associated with the interaction should be treated. For example, suppose a segment defines a user who always shops at Starbucks while in Germany. The interaction associated with that segment may include a rule that specifies that, if the user's location has been determined to be in Germany (e.g., via the GPS sensor on the user's mobile device), and the user's account balance has reached 0, the mobile application 206 should automatically top up the user's balance by 10 Euros. As another example, for a segment that defines users who enjoy dining out frequently, the corresponding interaction may be that restaurant coupons or specials should be periodically delivered (e.g., as movable tiles) to the user interface of the mobile application 206. As yet another example, for a segment that defines users who are U.S. citizens, the corresponding interaction may be that all transactions conducted by the user should use the U.S. dollar as a default currency. As a further example, for a segment that defines an M number of other users as the users who most recently or most frequently engaged with the user on social media, the corresponding interaction may be to display a movable tile on the user interface of the mobile application 206, where the tile informs the user that he/she can send money to, or request money from, any of the M number of other users.

It is understood that although FIG. 2 illustrates a one-to-one correspondence between the variations, segments, and the interactions, that is not intended to be limiting. In some other embodiments, each variation may be associated with multiple segments, and vice versa. Similarly, each segment may be associated with multiple interactions, and vice versa.

The ability of the personalization service 216 to define the variations, segments, and/or interactions is one of the novel features of the present disclosure. Whereas conventional mobile applications define the user interface layout in a rigid and fixed manner and do not take each user's unique profile or context into account, the personalization service 216 allows the user interface layout of the mobile application 206 to be customized for each user, based on the context or environment surrounding the user.

It is understood that in the embodiment shown in FIG. 2, the analysis of the user's data, the determination of the segment(s) appropriate for the user, and/or the corresponding interaction for the user may all be determined by the personalization service 216 (which resides on the server), rather than by the mobile application 206 locally on the mobile device 202. For example, in response to a user executing the mobile application 206 on the mobile device 202, the mobile application 206 may send a request (e.g., via the SDK 208 and the mobile orchestration layer 210) to the personalization service 216 to display a user interface for the mobile application 206. After receiving such a request, the personalization service 216 analyzes the user data, which may include analyzing the user data stored in the database 226, and/or querying the mobile application 206 to retrieve additional user data from the mobile device 202. Based on the analysis, the personalization service 300 determines the appropriate segment(s) for the user, and possibly even defines one or more new segments for the user. Thereafter, according to the interaction assigned to the determined segment(s), the personalization service 214 sends instructions to the mobile application 206 to display one or more user interface elements (e.g., the variations) that are associated with the segment(s).

In this manner described above, the mobile application 206 itself does not make "decisions" as to how to render the user interface. Rather, these "decisions" are made by the personalization service 216, and the mobile application 206 merely executes the instructions (e.g., the "decisions") from the personalization service 216. This scheme is advantageous, because the personalization service 216 has much greater computing resources and data storage capabilities than the mobile device 202. Accordingly, the personalization service 216 can make more accurate determinations regarding the segments appropriate for the user, and make better "decisions" as to how to dynamically render a customized user interface for the user in order to best suit the user's needs.

It is also understood that, according to the architecture of the present disclosure, not only will different users experience different user interfaces—since they likely will be associated with different segments—even the same user may experience different user interfaces depending on the context in which the mobile application 206 is accessed. For example, a user who is using the mobile application 206 domestically (e.g., within the U.S.A.) may experience one type of user interface layout, where all transactions are performed using the U.S. dollar as a default currency, and most, if not all, of the functionalities of the mobile application are enabled. However, if the same user travels abroad to a different country X, he may see a different user interface of the mobile application 206. For example, the default currency may now be changed to a currency that is used in the country X. In addition, the country X may have laws or regulations that forbid some of the functionalities of the mobile application, for example sending money to another user via an email address. Consequently, the personalization service 216 may send instructions to the mobile application 206 to disable these functionalities, for example by "graying out" the relevant tiles corresponding to these functionalities, or by hiding or not displaying these relevant tiles altogether.

In some embodiments, such as in the embodiment shown in FIG. 2, the decision making of the personalization service 216 discussed above is performed by a personalization engine 218. For example, the personalization engine 218 may define the details of the variations, the segments, and the interactions, analyze the user data (either retrieved from the mobile device 202 or stored on the database 226) to determine which segment is best suited for the user, and how the user interface on the mobile application 206 should be rendered based on the determination. In some embodiments, the personalization engine 218 may include one or more computer processors and/or electronic memory storing instructions, wherein the one or more computer processors execute the stored instructions to perform the decision making discussed above.

In some embodiments, the personalization engine further includes a ranking module 220. The ranking module is configured to rank certain user interface elements above others with respect to rendering the user interface. For example, a user may be associated with a profile (e.g., segment) specifying that user interface elements (e.g., tiles) A, B, C, and D should be displayed as a part of the customized user interface for that user. However, the mobile application 206 may monitor which user interface elements the user interacts with more frequently than others. Over time, the ranking module 220 may determine (based on the reports from the mobile application 206) that the user interacts with the user interface elements A and B (e.g., corresponding to account activity and balance, respectively) more than with C and D. In response to this determination, the ranking module 220 may rank the user interface elements A and B over the user interface elements C and D. In some embodiments, the higher ranking of the user interface elements A and B may mean that they get displayed first or in a more prominent position in the user interface (e.g., at the top of the screen). In other embodiments, the higher ranking of the user interface elements A and B may mean that they will always remain displayed on the screen, even if the user navigates to different screens of the user interface, whereas the user elements C and D may become hidden when the user navigates to a screen where C and D are not typically displayed.

In some other embodiments, the ranking module 220 may also determine the precedence or priority of user segments, for example when a plurality of suitable user segments has been determined for the same user. As an example, suppose a user has been determined to belong to a first segment corresponding to U.S. citizens or residents (e.g., based on the user's registration information), as well as a second segment corresponding to someone who is currently located in Singapore (e.g., based on the geographical location of the mobile device of the user reported by the GPS unit on the mobile device). Also suppose that the interaction for the first segment specifies that the user interface should display user elements 1 through 10, but the interaction for the second segment specifies that the user interface should display user elements 1 through 5. The ranking module 220 will decide which of these segments (and thus the corresponding interaction) should take priority or precedence over the other. If the ranking module 220 decides that the first segment and the interaction associated therewith should take priority, then the ranking module 220 will instruct the mobile application 206 to display user elements 1 through 10 as a part of the user interface. If the ranking module 220 decides that the second segment and the interaction associated therewith should take priority, then the ranking module 220 will instruct the mobile application 206 to display user elements 1 through 5 as a part of the user interface.

Another aspect of the present disclosure is the ubiquity between the mobile platform and the web platform. For example, a user may make a first request to display the user interface on a screen of the mobile device 202. As discussed above, the personalization service 216 may analyze user data based on the first request, determine a segment to which the user belongs, and then instruct the mobile application to render a user interface that includes elements (e.g., the variations) associated with the segment. Sometime later, the same user may also make a second request, for example via a web browser running on the computer 204, to display the same user interface (or a similar user interface) in the web browser on a screen of the computer 204. The personalization service 216 may analyze user data again based on the second request, and if the determination is still that the user belongs to the same segment, then personalization service 216 may instruct the web browser to render a user interface similar to the one displayed by the mobile application 206.

Of course, there may be slight aesthetic differences (e.g., due to different screen real estate) between the user interface displayed via the mobile application and the user interface via the web browser. However, the user experience in terms of interacting with the user interfaces on the mobile platform and the web platform should be the same. As an example, supposed a tile (as a user interface element) has been previously displayed in the user interface on the mobile application 206, where the tile prompts the user to take an action, such as sending funds to another user. If the user has performed this task, then when the user interface is displayed in the web browser, such a tile no longer needs to be displayed, because the user has already taken the action associated with that tile.

Still referring to FIG. 2, the user interface configuration module 214 may include domain services 228. The domain services 228 include modules (which may be software, hardware, or both) that handle the actual execution of the actions that the user performs with the user interface. For example, the user may request to receive money from a user by clicking on a tile, or request to send money to a user by clicking on another tile, etc. The domain services 228 handle the actual movement of the funds in response to the user's actions. As shown in FIG. 2, the domain services 228 electronically communicate with the personalization service 216 to carry out these tasks.

Figure 3:
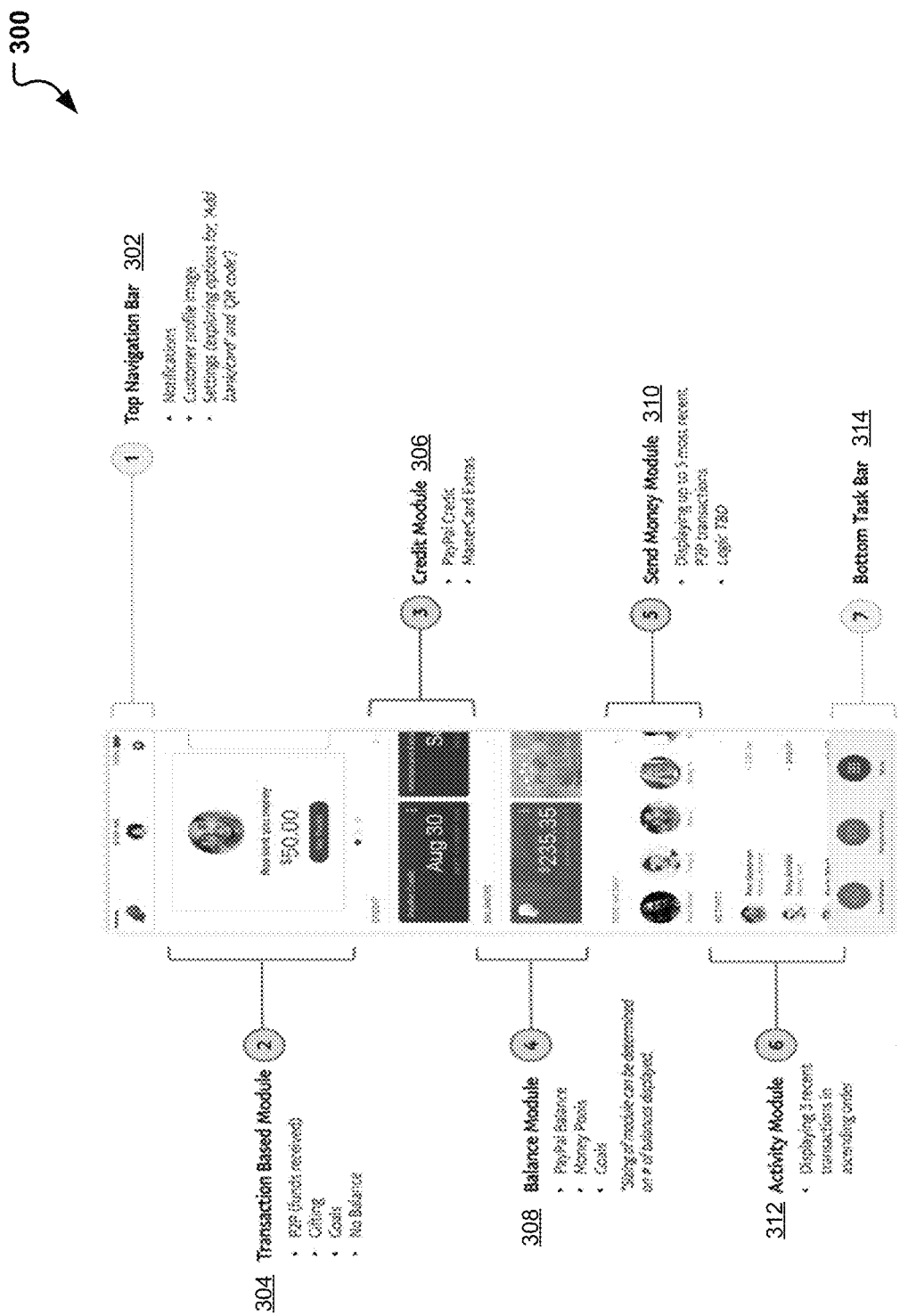
FIG. 3 illustrates an example of the customized user interface of a user device application according to various aspects of the present disclosure.

Referring now to FIG. 3, an example user interface 300 is illustrated according to various aspects of the present disclosure. The user interface 300 may be an embodiment of the user interface displayed for the mobile application 206 on the mobile device 202 of FIG. 2. The user interface 300 includes a Top Navigation Bar 302, a Transaction Based Module 304, a Credit Module 306, a Balance Module 308, a Send Money Module 310, an Activity Module 312, and a Bottom Task Bar 314.

The Top Navigation Bar 302 and the Bottom Task Bar 314 may be fixed display elements of the user interface 300 and may not change. In other words, they will be rendered as a part of the user interface 300 regardless of who the user is, or what the context is for the user launching the user interface 300. One reason for the Top Navigation Bar 302 and the Bottom Task Bar 314 being fixed is that they include such commonplace elements that every user should or is likely to use. For example, the Top Navigation Bar 302 may include a profile picture of the user, an alert icon to inform the user of incoming notifications/alerts, and a settings icon to allow the user change or configure the settings for the user interface 300 (which may include options to add banks or generating QR codes). The Bottom Task Bar 314 may include a "Send Money" icon to allow the user to send funds electronically to another user, a "Request Money" icon to allow the user to request funds from another user, and "More" that allows the user to see additional actions.

The Transaction Based Module 304 may include one or more movable tiles that allow the user to conduct peer-to-peer (P2P) transactions, gifting, setting goals for transactions, and indicating a no balance. The Credit Module 306 may include one or more movable tiles that allow the user to request PayPal credit or to apply for other credit-card-related benefits (e.g., MasterCard Extras). The Balance Module 308 may include one or more movable tiles that allow the user to view the user's balance with PayPal, or the balance with a money pool, or goals for the balance. The Send Money Module 310 may include one or more movable tiles that allow the user to send money to a number of other users (e.g., five) with whom the user has recently conducted P2P transactions. The Activity Module 312 may include one or more movable tiles that allow the user to display recent activities of the user, for example by displaying three recent transactions in an ascending order. It is understood that the tiles or functionalities discussed above for each of the modules 302-314 may be merely examples. Other tiles or functionalities not shown in FIG. 3 or discussed above may be implemented for any of these modules 302-314 in other embodiments. In addition, the size of the tiles or the size of the modules 302-314 themselves may be dynamically adjusted, for example depending on how many tiles are included in each module. The size of the tiles may also be adjusted based on the specific user. For example, the system may determine that the user typically zooms in content or uses a larger font for display settings. In such a case, the tiles may be larger than tiles rendered for a different user who does not typically zoom in content or uses a smaller font setting.

In contrast to the Top Navigation Bar 302 and the Bottom Task Bar 314, the various modules 304-312 may be dynamically rendered. In other words, these modules 302-312 may correspond to the user interface elements (e.g., the variations in FIG. 2) that are each associated with a respective user segment. Among different users, or even for the same user who is launching the mobile application 206 at a different time, a different location, or under a different circumstance, different modules may be rendered by the user interface 300. For example, for a first user, the modules 306-308 (but not 308-310) may be rendered, while for a different user, the modules 308-310 (but not 304-306) may be rendered. Of course, the modules herein are merely examples, and it is understood that the user interface 300 may render a plurality of other modules not shown in FIG. 3.

Based on the discussions above, it can be seen that the present disclosure pertains to an architecture in which a user interface layout for a mobile application 206 is not hard coded into the mobile application 206. Rather, the user interface layout is dynamically rendered based on instructions from a remote server. However, situations may exist where the mobile application device will not be able to communicate with the remote server, for example when there is a complete loss of all network connectivity for the mobile device 202 (e.g., no cellular signal or Wi-Fi), or when the server is down due to maintenance or unexpected failure. The architecture of the present disclosure anticipates the occurrence of such situations and provides a solution by generating a default layout for the user interface in response to a detection of a loss of network connectivity.

For example, when the mobile device 202 is able to communicate with the user interface configuration module 200 e.g., an embodiment of the server), the user interface configuration module 214 may send instructions to the mobile device 202 to collect or cache user data. The types of user data cached may be similar to the type of user data used by the personalization engine 218 to determine a user's profile (e.g., segment), similar to the discussions above.

The user interface configuration module 214 may also instruct the mobile device 202 to generate one or more default user interface layouts based on the cached user data. For example, if the cached data indicates that the user interacts with user interface elements (e.g., the different variations of FIG. 2) A, B, C, D frequently, but only sporadically with the rest of the user interface elements, then the default user interface layout may include at least the user interface elements A, B, C, D, but the rest of the user interface elements may be optionally included or omitted altogether. When the mobile device 202 detects a loss of network connectivity or is otherwise unable to communicate with the user interface configuration module 200, the mobile application 206 may render this default user interface layout, until communication with the user interface configuration module 214 is available again. In this manner, the architecture of the present disclosure provides a solution to account for unexpected situations such as loss of network connectivity, without causing major disruptions for a user experience in using the mobile application 206.

Embodiments of the present disclosure described above involve an architecture in which the user interface configuration module 214 is implemented on a server remotely located from the mobile application 209, so as to take advantage of the server's superior computing capabilities and database storage resources. However, such a scheme is not intended to be limiting unless specifically claimed. It is understood that a module similar to the user interface configuration module 214 may be implemented on the mobile device 202 in alternative embodiments. Such a module on the mobile device 202 may supplement the functionalities of the user interface configuration module 214, or even replace it altogether, for example as the hardware and/or software capabilities of the mobile device 202 progress beyond a predetermined threshold. Regardless of how the user interface configuration module 214 is implemented, the user experience for using the mobile application 206 should remain substantially the same. That is, the users will experience a dynamically changing/evolving user interface that is customized to their personal characteristics and needs.

Figure 4:
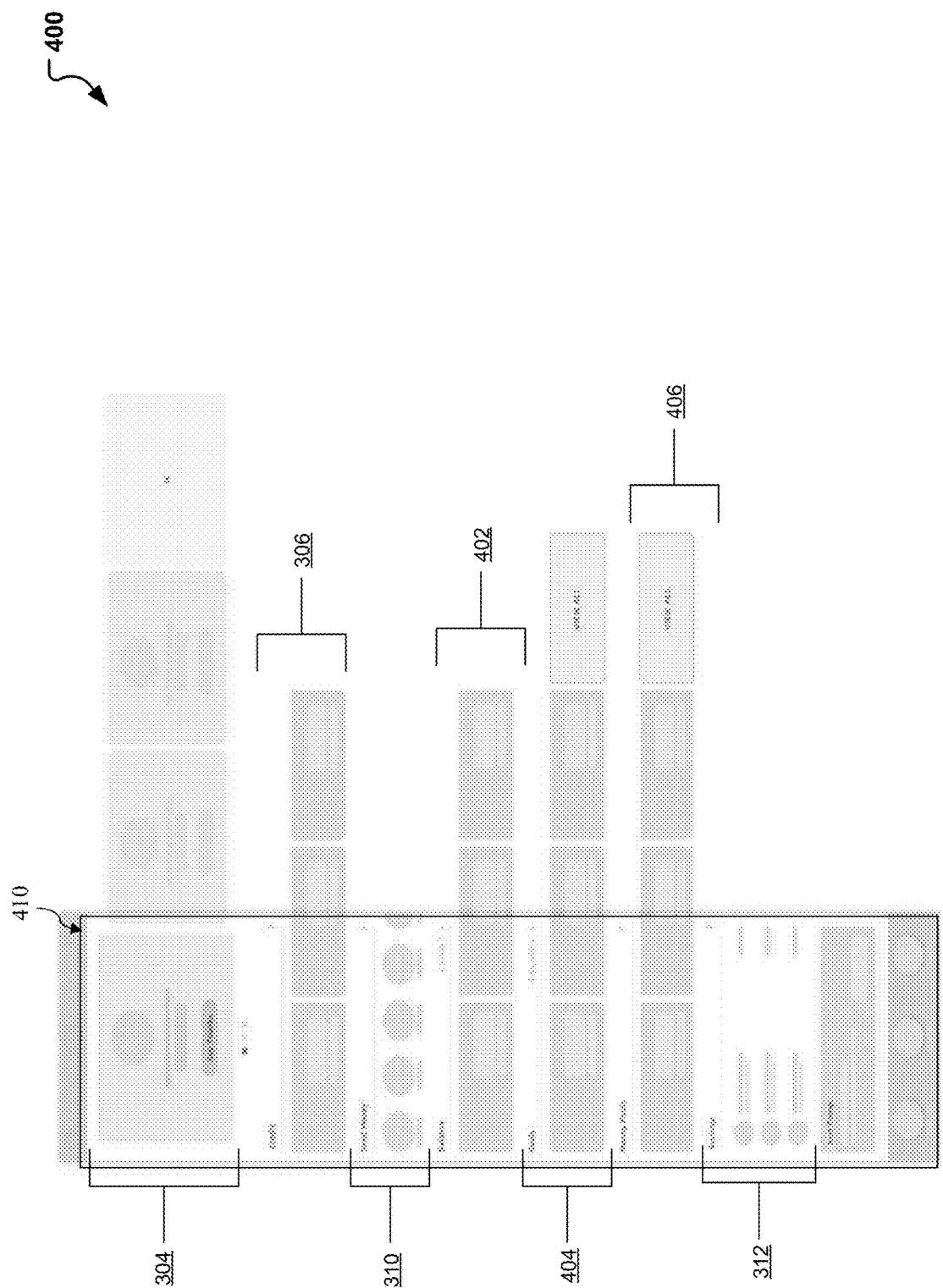
FIG. 4 illustrates an example wireframe diagram illustrating the customized user interface of the user device application according to various aspects of the present disclosure.

Turning to FIG. 4, an illustration of a wireframe diagram of a user interface 410 on the mobile device application 206 according to various aspects of the present disclosure is presented. In particular, FIG. 4 illustrates an exemplary user interface layout as determined by the personalization engine 218 using the ranking module 220. In FIG. 4, an illustration of how the various user interface elements (e.g., tiles) are organized is presented. In this instant, based on user interactions with the various user interface elements, user location, transactional history, etc., a determination is made, for example, that the balance module 308 is predominantly used and three distinct tiles or user interface elements 402, 404, 406 should be presented on the user interface 410.

Accordingly, user interface 410 is illustrated with transaction based module 304 sitting on the top portion of the user interface 410. As indicated, the transaction based module 304 includes movable tiles that may be included to conduct pear-to-peer transactions, gifting, and setting goals. Additionally, the transaction based module 304 may also provide notifications arriving from a contact, bank, marketplace, or other entity where a transaction has occurred or may occur. In addition, as illustrated on FIG. 4, the transaction based module 304 can include two or more (e.g., 1 . . . N) tiles that may be interacted with and accessed via a swiping gesture, clicking motion, facial movement, eye, or other biometric motion. The tiles may reside in a rolodex type fashion and can each represent one or more P2P transactions, notifications, goals, gifting actions, and the like.

Further to the transaction based module 304, the credit module 306 and send money module 308 may next be displayed on the customizable user interface 410. The credit module 306 as indicate, can include credit card related tiles including for example a PayPal Credit card payment due reminder, amount due, payment date, credits earned, and other credit card related extras. The send money module 308 may provide access to one or more users or contacts. Like the transaction based module 304, the credit module 306 and the send money module 308 also include tiles which are movable and accessible using one or many hand gestures, biometric indications, etc.

As discussed, the customizable user interface 410 is updated based in part on the user interactions with the mobile application 206. As such, in this exemplary wireframe UI diagram 400, the user interface 410 is designed to the balance module represented over three distinct elements 402, 404, and 406, which include user balances, goals, and money pools respectively. Therefore, if a user carries a balance with PayPal and other entities, these can be displayed and accessed using the Balance module or element 402. Additionally, if the user also has several budget goals he/she would like to set for use in making a purchase, these can be displayed in a goals module 404 and similarly any money pools in which the user participates in can be illustrated and presented under a money pool module 404. Account activity can be summarized and displayed in the activity module 312. As illustrated, the number of goals, balances, money pools, and transactional activity can be numerous and can be displayed as illustrated in FIG. 3. Therefore, each of the tiles within the activity module 312 (or any other module) may be placed in a horizontal manner as a subset of tiles available for the corresponding module with access to the various items using a scrolling, swiping, or other gesture motion and/or biometric indication.

Note that although the transaction module 304, credit module 306, and balance module 308 are primarily illustrated and described in conjunction with FIG. 4, other user interface elements may be presented on the user interface 410. Additionally, although the user interface elements are displayed in a certain order, the user interface 410 is not restricted to the order and may be updated, customized further, and/or manipulated by the user using at least a menu or other option/setting, gesture, via a primary or secondary device setting, etc. For example, turning to FIG. 4, the goals tile 404 may be moved above the balance tile 402 and the send money module 310 below the money pool module 406, etc. In addition to the location of the tiles, the mobile application 202 allows the user to interact with each tile for further user interaction with the user interface 410. Additionally, each of the modules may be displayed on the customized user interface 410 in a vertical manner (one on above the other) and with each subset of tiles (corresponding to module) available horizontally.

Figures 5A, 5B:
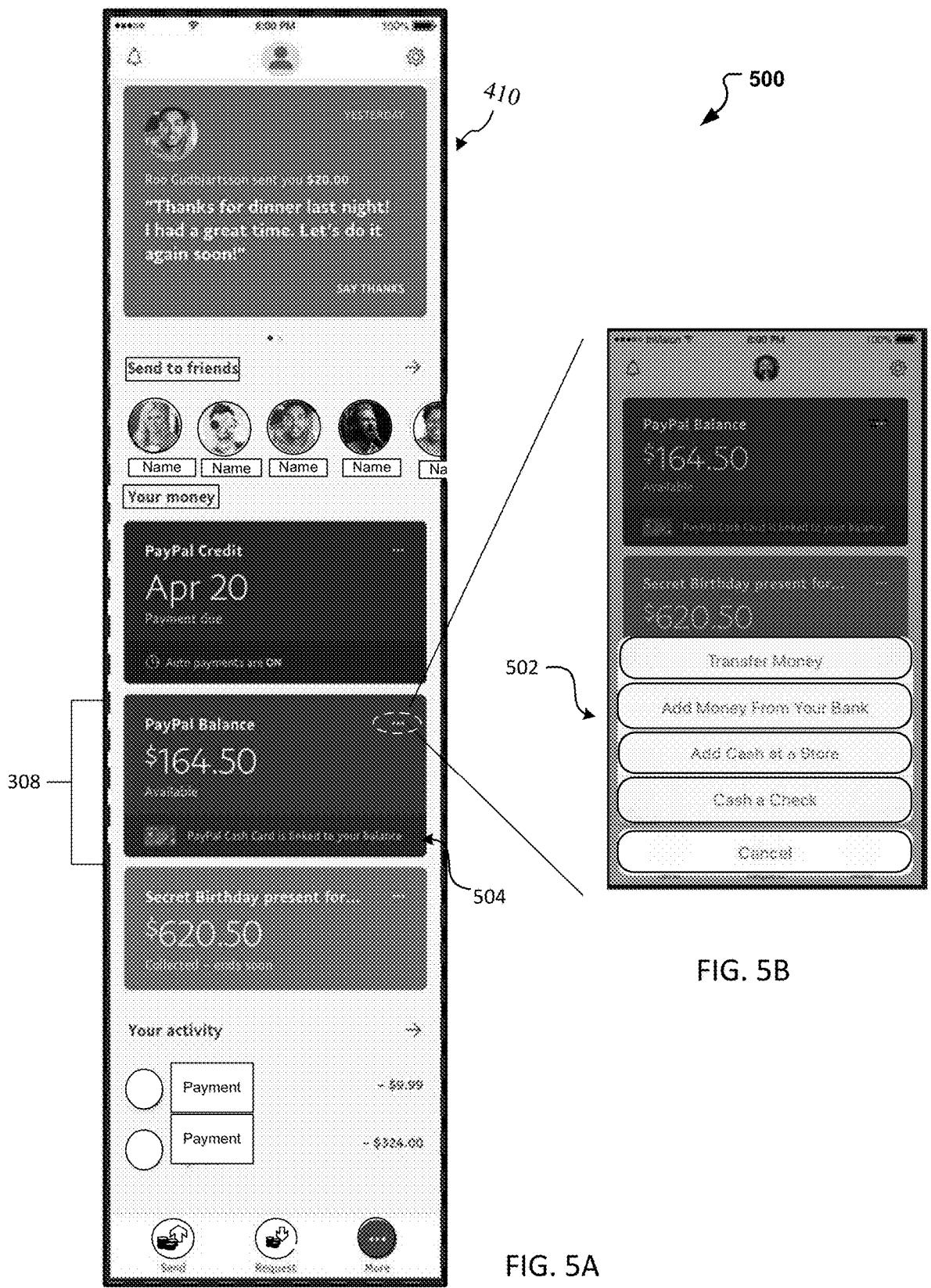
FIGS. 5A-5B illustrate a user interaction with the customized user interface of the user device application.

As an example, FIGS. 5A-6C are presented to illustrate various interactions permissible through the use of the customizable user interface 410. In particular, FIGS. 5A-4B illustrate a user interaction 500 with the customized user interface 410 of the user device application 206. In this user interaction, at FIG. 5A, an exemplary user interaction is illustrated where the balance module 308 is presented and the balance tile 504 is selected on the customized user interface 410. In the current embodiment, the selection of the balance tile 504 prompts the appearance of a secondary user interface 502 designed to present a menu of options available for use in relation with the balance tile 504, as illustrated on FIG. 5B. The appearance of the secondary user interface 502 may appear in the form of a pop-up screen, contextual window, dialog box, modal or palette window, or other graphical user interface which can appear upon the selection of the balance tile 504. The context, options, and layout of the secondary user interface 502 may also be customizable based in part on the user interactions with the user interface, profile preferences, geological location of the user, etc. In some embodiments, the contents of the secondary user interface 502 may be customized based on some pre-defined options, user interactions, and/or in an order most applicable to the user. In other embodiments, the contents of the secondary user interface 502 may reside on the server, on the mobile device 202, in a cache and/or as part of middle ware, etc.

In one example, the selection of the balance tile 504 on the customized user interface provides a display of the secondary user interface 502 providing a menu listing of options permissible when interacting with such tile. For example, FIG. 5B illustrates options including the transfer of money, add money from your bank, add cash at a store, cash a check, and cancel option. Note that as one of the options is selected, the user pay me presented with yet another user interface designed to complete the transaction selected. For example, if the option to transfer money is selected, the user may then be presented with another user interface where various funding instruments are available for selection as well as a monetary amount, among other possibilities. Similarly, other user interfaces may appear for cashing a check, add cash at a store, etc.

Figures 6A, 6B, 6C:
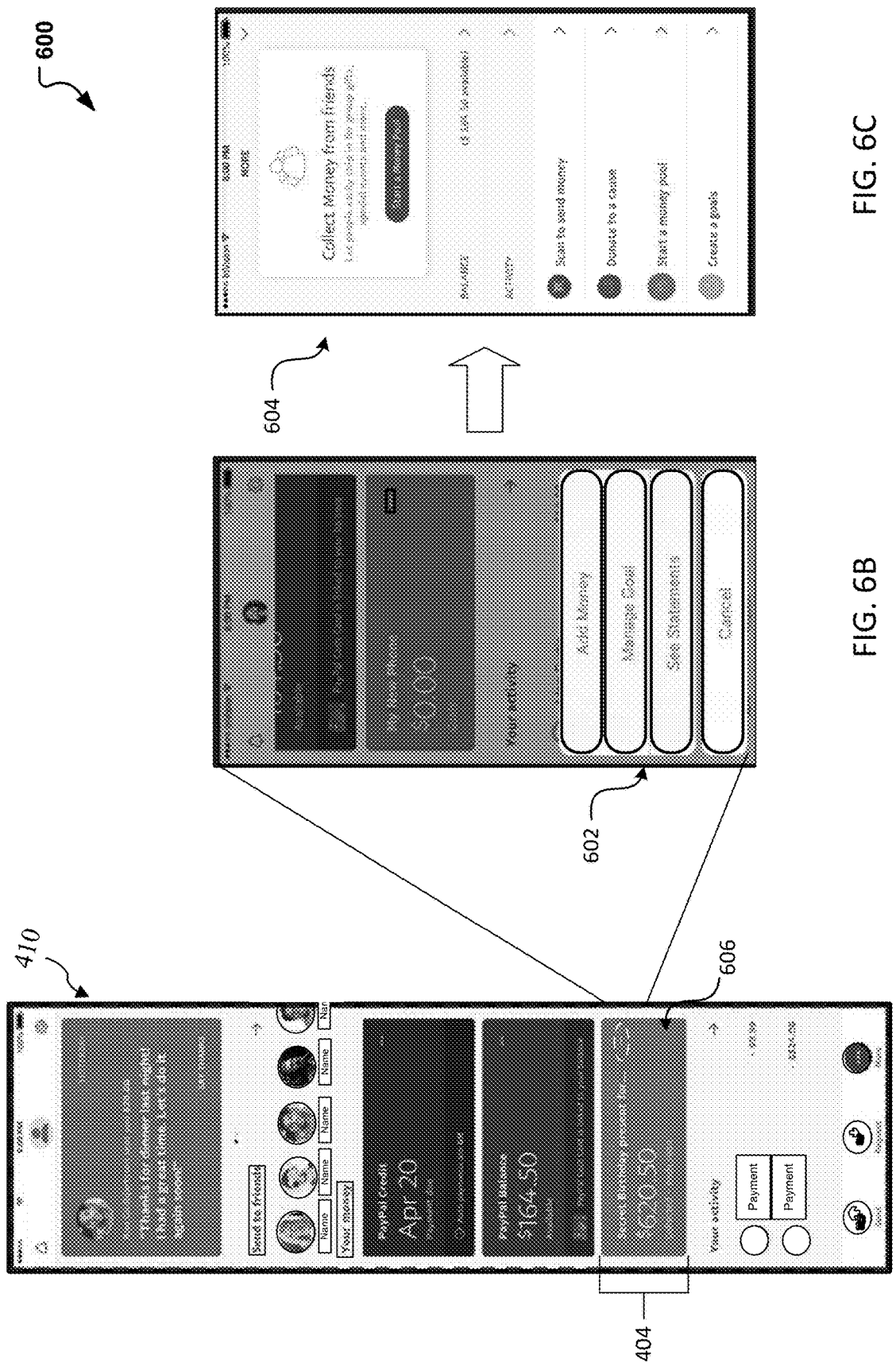
FIGS. 6A-6C illustrates another user interaction with the customized user interface of the user device application.

Turning to FIGS. 6A-6C, yet another user interaction 500 with the customized user interface 410 of the user device application 206. In particular, a user interaction is illustrated wherein the goals module 404 including a goals tile 606 has been selected. As illustrated, in this customized user interface 410, the goals tile 606 has been identified as being frequently used and provided as a primary tile on the customized user interface 410. Upon selection of such tile, again a new/tertiary user interface 602 is presented to the user with options on how to proceed provided a goals tile 404 was selected. The tertiary user interface 602 like the secondary user interface 502 described above and in conjunction with FIG. 5B can appear in the form of a pop-up screen, contextual window, dialog box, modal or palette window, or other graphical user interface. The context, options, and layout of the tertiary user interface 602 may also be customizable based in part on the user interactions with the user interface, ranking module, profile preferences, geological location of the user, etc. In some embodiments, the contents of the tertiary user interface 602 may be customized based on some pre-defined options, user interactions, and/or in an order most applicable to the user. In other embodiments, the contents of the secondary user interface 502 may reside on the server, on the mobile device 202, in a cache and/or as part of middle ware, etc.

For the example where the goals tile 602 is selected, options for selection can include add money, manage a goal, see statements, and a cancellation option. Additionally, other options not illustrated in tertiary user interface 602 may also be available for selection, including but not limited to adding a goal, adding a contact, updating the funding source or item for purchase with monetary goal, etc. Once a selection has been made, additional graphical user interfaces may be presented to the user. As an illustration, FIG. 6C is presented herein to illustrate an exemplary goal UI 604 where the option to manage a goal is selected by a user. In this goal UI 604, options may be presented for managing the goal that the user is interested in obtaining, starting, managing, etc. For example, illustrated in FIG. 6C, is the option to start a new goal, with the opportunity to add a monetary amount, description, contacts, funding source, add a money pool, etc. Additionally, any transactional activity may be viewed if so desired. The addition of the monetary amount, description, contacts, funding source, etc., can be made via a series of selections, by connecting to a social media network (for adding friends, contacts, etc.), identifying a goal on a text conversation, analyzing a user search history, calendar invite, vocal conversation, photos exchanged, etc. Similarly, other options presented via the selections of the other tiles (e.g., balance, donations, money requests/transfers) can be customized based on a user's preferences, location, profile, conversation, social media posts, calendar, and the like.

Notice also that further to the specified modules of FIG. 3, including transaction based module 304, credit module 306, balance module 308, send money module 310, and activity module 312 other modules may be contemplated. These additional modules like those described may derive also derive from user mobile application 206 based interactions and ranking module 220 as well as external interactions with both the mobile device 202 and other smart devices. For example, interactions with a smart watch can be used to determine that a user also has a weight goal and those biometrics obtained can be used to add a training session goal. As another example, the weigh goal may be added separately as a health tile to the mobile application. As another example, the user may communicate with Alexa and transactions requested may be communicated to the mobile device 202 and added to the mobile application 206 as a further customization feature.

Figure 7:
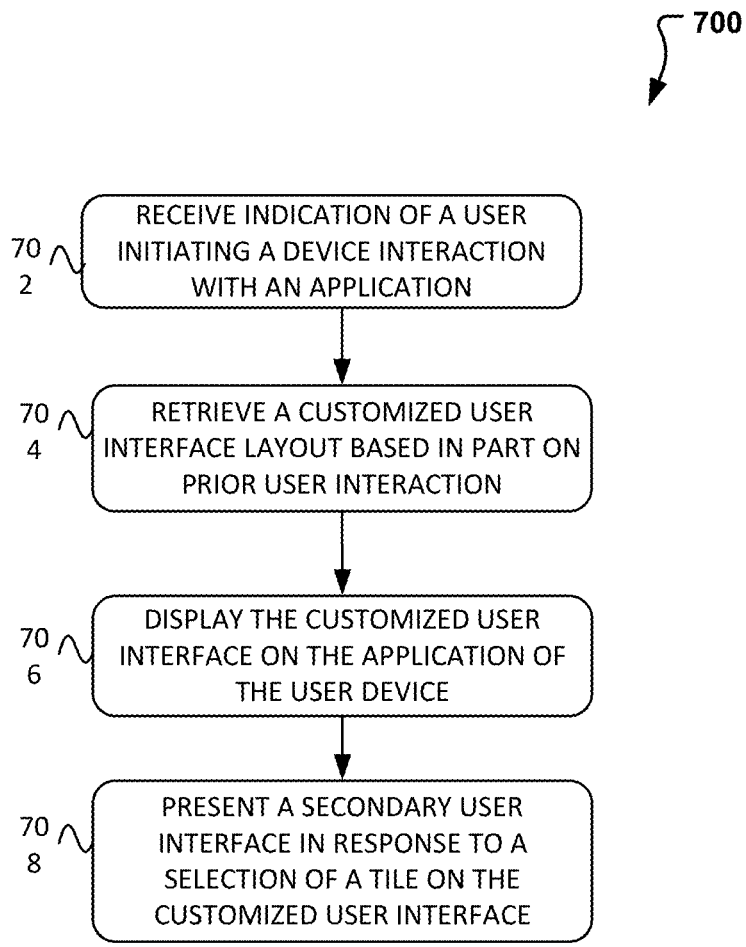
FIG. 7 illustrates a flow diagram of a method for generating the customized user interface.

To illustrate an exemplary use and generation of such customizable user interface, FIG. 7 illustrates an example process 700 for generating the customized user interface. In particular, FIG. 6 illustrates an example process for presenting and updating the user interface base on a prior user interaction. According to some embodiments, process 700 may include one or more of operations 702-708, which may be implemented, at least in part, in the form of executable code stored on a non-transitory, tangible, machine readable media that, when run on one or more hardware processors, may cause a system to perform one or more of the operations 702-708.

Process 700 begins with operation 702, where a user device is in user and a selection or other indication is received by the user device that an interaction with a mobile application is desired. At operation 702, the indication may be received in a form of a single click, double click, tap, voice command, facial gesture or other which send a request for the mobile application to open for use.

At operation 704, the user associated customized user interface is retrieved. For the retrieval, the mobile device may communication with an external server for the access of the customized user interface. The communication may occur over a network and in communication with a user interface configuration module which may exist with a third party service provider or other entity in which personalization engine and ranking module may use user application and mobile interactions to determine segments, tiles, and layout of the customized user interface to be transmitted for display on a display of the user mobile device. Alternatively, user interaction and configuration module may exist internally within the mobile device and access/retrieval of such the customized user interface is found locally. Note that as indicated above and in conjunction with FIGS. 1-6C, the user interface may be customized based in part on user interactions with the mobile application, mobile device, location, and/or manually by a user.

Once the customized user interface has been retrieved, the customized user interface may be displayed as a graphical user interface on the application of the user/mobile device. Accordingly, at operation 706, a user interface is presented which includes segments and corresponding tiles which are most frequently used and appropriate for a user, time, location, profile, etc.

At operation 708, process 700 continues and is presented based in part on the segment and tile selected for interaction. Therefore, at operation 708, a secondary user interface is presented to on the display of the user device in response to a selection of a tile on the customized user interface. Process 700 may continue as other tiles are selected and user interfaces are presented which are customized for a user of the mobile device.

Note that FIG. 7 provides an exemplary method for accessing a customized user interface. However, more or less operations may be used as well as gestures, movements, and methods for interacting with the user interface.

Figure 8:
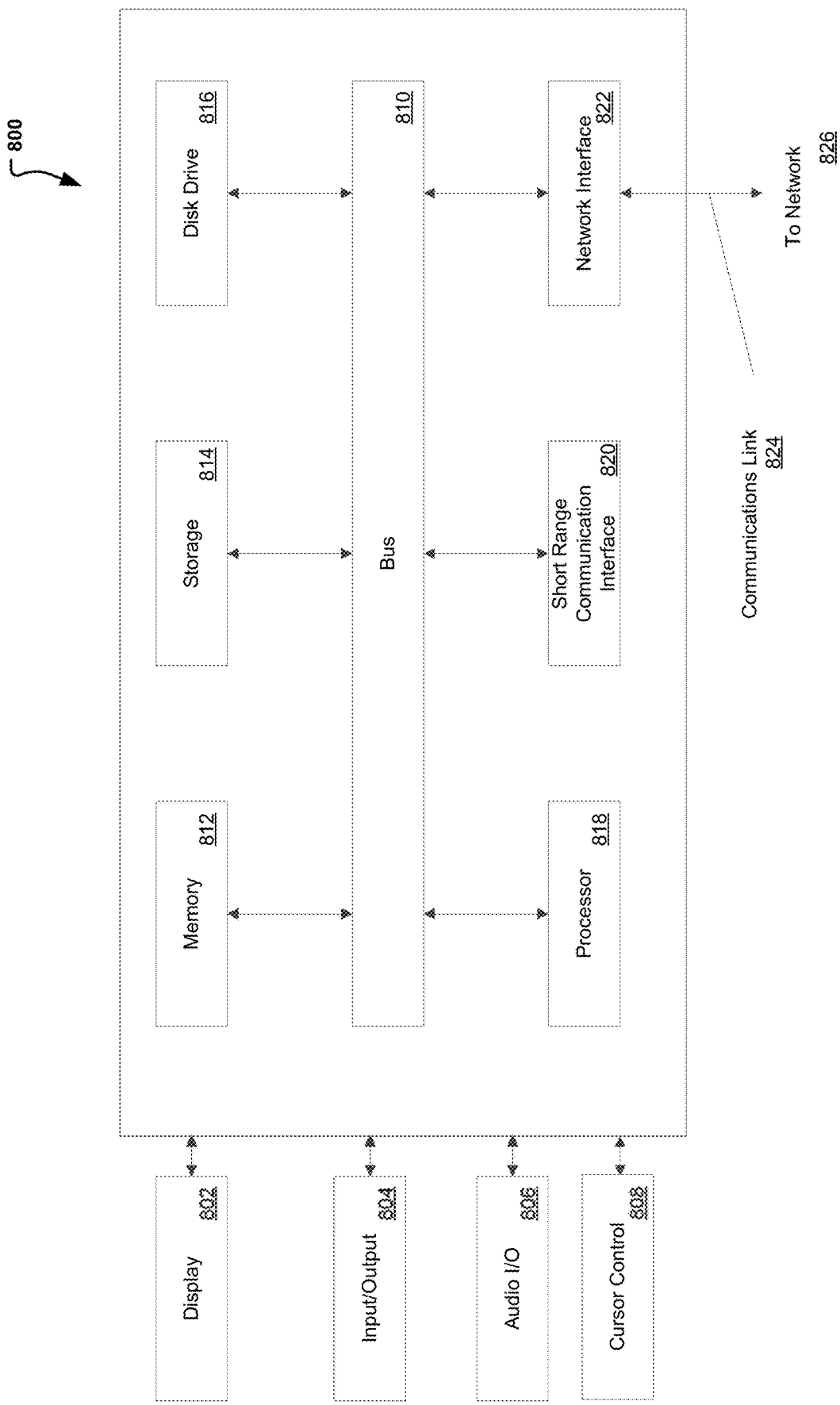
FIG. 8 illustrates an example block diagram of a computer system suitable for implementing one or more devices of the communication systems of FIGS. 1-7.

FIG. 8 illustrates an example computer system 800 in block diagram format suitable for implementing on one or more devices of the system in FIGS. 1-7. In various implementations, a device that includes computer system 800 may comprise a personal computing device (e.g., a smart or mobile device, a computing tablet, a personal computer, laptop, wearable device, PDA, etc.) that is capable of communicating with a network 826. A service provider and/or a content provider may utilize a network computing device (e.g., a network server) capable of communicating with the network. It should be appreciated that each of the devices utilized by users, service providers, and content providers may be implemented as computer system 800 in a manner as follows.

Additionally, as more and more devices become communication capable, such as new smart devices using wireless communication to report, track, message, relay information and so forth, these devices may be part of computer system 800. For example, windows, walls, and other objects may double as touch screen devices for users to interact with. Such devices may be incorporated with the systems discussed herein.

Computer system 800 may include a bus 810 or other communication mechanisms for communicating information data, signals, and information between various components of computer system 800. Components include an input/output (I/O) component 804 that processes a user action, such as selecting keys from a keypad/keyboard, selecting one or more buttons, links, actuatable elements, etc., and sending a corresponding signal to bus 810. I/O component 804 may also include an output component, such as a display 802 and a cursor control 808 (such as a keyboard, keypad, mouse, touchscreen, etc.). In some examples, I/O component 804 other devices, such as another user device, a merchant server, an email server, application service provider, web server, a payment provider server, an ATM server, and/or other servers via a network. In various embodiments, such as for many cellular telephone and other mobile device embodiments, this transmission may be wireless, although other transmission mediums and methods may also be suitable. A processor 818, which may be a microcontroller, digital signal processor (DSP), or other processing component, that processes these various signals, such as for display on computer system 800 or transmission to other devices over a network 826 via a communication link 824. Again, communication link 824 may be a wireless communication in some embodiments. Processor 818 may also control transmission of information, such as cookies, IP addresses, images, and/or the like to other devices.

Components of computer system 800 also include a system memory component 814 (e.g., RAM), a static storage component 814 (e.g., ROM), and/or a disk drive 816.

Computer system 800 performs specific operations by processor 818 and other components by executing one or more sequences of instructions contained in system memory component 812 (e.g., for engagement level determination). Logic may be encoded in a computer readable medium, which may refer to any medium that participates in providing instructions to processor 818 for execution. Such a medium may take many forms, including but not limited to, non-volatile media, volatile media, and/or transmission media. In various implementations, non-volatile media includes optical or magnetic disks, volatile media includes dynamic memory such as system memory component 812, and transmission media includes coaxial cables, copper wire, and fiber optics, including wires that comprise bus 810. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 800 may also include a short range communications interface 820. Short range communications interface 820, in various embodiments, may include transceiver circuitry, an antenna, and/or waveguide. Short range communications interface 820 may use one or more short-range wireless communication technologies, protocols, and/or standards (e.g., WiFi, Bluetooth®, Bluetooth Low Energy (BLE), infrared, NFC, etc.).

Short range communications interface 820, in various embodiments, may be configured to detect other devices (e.g., user device 202, personal device 204, etc.) with short range communications technology near computer system 800. Short range communications interface 820 may create a communication area for detecting other devices with short range communication capabilities. When other devices with short range communications capabilities are placed in the communication area of short range communications interface 820, short range communications interface 820 may detect the other devices and exchange data with the other devices. Short range communications interface 820 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 820 may identify a local area network using a short range communications protocol, such as WiFi, and join the local area network. In some examples, computer system 800 may discover and/or communicate with other devices that are a part of the local area network using short range communications interface 820. In some embodiments, short range communications interface 820 may further exchange data and information with the other devices that are communicatively coupled with short range communications interface 820.

In various embodiments of the present disclosure, execution of instruction sequences to practice the present disclosure may be performed by computer system 800. In various other embodiments of the present disclosure, a plurality of computer systems 800 coupled by communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 824 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A device, comprising
a non-transitory memory storing instructions; and
a processor configured to execute the instructions to cause the device to:
receive, via a selection on the device, a request to interact with a mobile application by a user of the device;
determine, via a mobile orchestration layer, a collected API call for a plurality of API calls required to process the request in a single API call;

retrieve, from a configuration module, a customized user interface layout associated with the user of the device based on the collected API call, wherein retrieving the customized user interface layout comprises:
  determining a location of the device;
  determining a plurality of user segments corresponding to the user of the device, wherein each user segment defines a persona shared by a certain type of users and is associated with an interaction, and wherein the user segments are determined based on at least the location of the device, a past behavior of the user monitored over a time period via the device, and a registration information of the user in the mobile application;
  determining a priority level for each of the user segments from the plurality of user segments;
  determining that a user segment has a highest priority of the user segments based on the priority level for each of the user segments of the plurality of user segments;
  determining a rule associated with the interaction associated with the user segment having the highest priority, the rule based on at least an account associated with the user, wherein the account is utilized by the user through the customized user interface layout of the mobile application;
  determining a presentation of the interaction for the account through the mobile application, wherein determining the presentation of the interaction includes determining that one or more movable modules should be displayed based on a frequency of use for each movable module of the one or more movable modules and the rule, wherein the each movable module comprises one or more activity tiles;
  determining allowed functionalities and restricted functionalities within the one or more activity tiles based on the location; and
  determining a display size of each of the one or more activity tiles within the customized user interface layout based on past user interactions with each of the one or more activity tiles and an amount of the one or more activity tiles in each of the one or more movable modules;
display the customized user interface layout comprising the one or more movable modules on a display of the device based on the presentation of the interaction, the display size of each of the one or more activity tiles, the allowed functionalities within the one or more activity tiles, and the restricted functionalities within the one or more activity tiles; and
present, in response to a selection of an activity tile of the one or more activity tiles on the customized user interface layout, a secondary user interface.

2. The device of claim 1, wherein the configuration module comprises personalization data and ranking data and wherein retrieving the customized user interface layout uses the personalization data and the ranking data.

3. The device of claim 1, wherein the secondary user interface is presented and customized based on the activity tile selected and a user interaction with the mobile application.

4. The device of claim 1, wherein the customized user interface layout includes two or more movable modules configured to display the one or more activity tiles.

5. The device of claim 4, wherein, for each of the two or more movable modules, a subset of the one or more activity tiles is available, and wherein each subset of the one or more activity tiles is presented in a horizontal manner and accessible via a swipe gesture.

6. The device of claim 4, wherein, for each of the two or more movable modules, a subset of the one or more activity tiles is available, and wherein each subset of the one or more activity tiles is presented in a tiled vertical manner.

7. The device of claim 4, wherein, for each of the two or more movable modules, a subset of the one or more activity tiles is available, and wherein each subset of activity tiles is accessible via at least one of a clicking motion, a facial movement, an eye motion, or a biometric.

8. A method, comprising:
  receiving, via a selection on a device, a request to interact with a mobile application by a user of the device;
  determining, via a mobile orchestration layer, a collected API call for a plurality of API calls required to process the request in a single API call;
  retrieving, from a configuration module, a customized user interface layout associated with the user of the device based on the collected API call, wherein retrieving the customized user interface layout comprises:
    determining a location of the device;
    determining a plurality of user segments corresponding to the user of the device wherein each user segment defines a persona shared by a certain type of users and is associated with an interaction, and wherein the user segments are determined based on at least the location of the device, a past behavior of the user monitored over a time period via the device, and a registration information of the user in the mobile application;
    determining a priority level for each of the user segments from the plurality of user segments;
    determining that a user segment has a highest priority of the user segments based on the priority level for each of the user segments of the plurality of user segments;
    determining a rule associated with the interaction associated with the user segment having the highest priority, the rule based on at least an account associated with the user, wherein the account is utilized by the user through the customized user interface layout of the mobile application;
    determining a presentation of the interaction for the account through the mobile application, wherein determining the presentation of the interaction includes determining that one or more movable modules should be displayed based on a frequency of use for each movable module of the one or more movable modules and the rule, wherein the each movable module comprises one or more activity tiles;
    determining allowed functionalities and restricted functionalities within the one or more activity tiles based on the location;
    determining a display size of each of the one or more activity tiles within the customized user interface layout based on past user interactions with each of the one or more activity tiles and an amount of the one or more activity tiles in each of the one or more movable modules;
  displaying the customized user interface layout comprising the one or more movable modules on a display of the device based on the presentation of the interaction, the display size of each of the one or more activity tiles, the allowed functionalities within the one or more activity tiles, and the restricted functionalities within the one or more activity tiles; and presenting, in response to a selection of an activity tile of the one or more activity tiles on the customized user interface layout, a secondary user interface.

9. The method of claim 8, wherein the configuration module comprises personalization data and ranking data and wherein the retrieving the customized user interface layout uses the personalization data and the ranking data.

10. The method of claim 8, wherein the secondary user interface is presented and customized based on the activity tile selected and a user interaction with the mobile application.

11. The method of claim 8, wherein the customized user interface layout includes two or more movable modules which allow the customized user interface layout to display the one or more activity tiles.

12. The method of claim 11, wherein, for each of the two or more movable modules, a subset of the one or more activity tiles is available, and wherein each subset of the one or more activity tiles is presented in a horizontal manner and accessible via a swipe gesture.

13. The method of claim 11, wherein, for each of the two or more movable modules, a subset of the one or more activity tiles is available, and wherein each subset of the one or more activity tiles are presented in a tiled vertical manner.

14. The method of claim 11, wherein, for each of the two or more movable modules, a subset of the one or more activity tiles is available, and wherein each subset of activity tiles is accessible via at least one of a clicking motion, a facial movement, an eye motion, or a biometric.

15. A non-transitory machine-readable medium having stored thereon machine-readable instructions executable to cause a machine to perform operations comprising:

receiving, via a selection on a device, a request to interact with a mobile application by a user of the device;

determining, via a mobile orchestration layer, a collected API call for a plurality of API calls required to process the request in a single API call;

retrieving, from a configuration module, a customized user interface layout associated with the user of the device based on the collected API call, wherein retrieving the customized user interface layout comprises:

determining a location of the device;

determining a plurality of user segments corresponding to the user of the device wherein each user segment defines a persona shared by a certain type of users and is associated with an interaction, and wherein the user segments are determined based on at least the location of the device, a past behavior of the user monitored over a time period via the device, and a registration information of the user in the mobile application;

determining a priority level for each of the user segments from the plurality of user segments;

determining that a user segment has a highest priority of the user segments based on the priority level for each of the user segments of the plurality of user segments;

determining a rule associated with the interaction associated with the user segment having the highest priority, the rule based on at least an account associated with the user, wherein the account is utilized by the user through the customized user interface layout of the mobile application;

determining a presentation of the interaction for the account through the mobile application, wherein determining the presentation of the interaction includes determining that one or more movable modules should be displayed based on a frequency of use for each movable module of the one or more movable modules and the rule, wherein the each movable module comprises one or more activity tiles;

determining allowed functionalities and restricted functionalities within the one or more activity tiles based on the location;

determining a display size of each of the one or more activity tiles within the customized user interface layout based on past user interactions with each of the one or more activity tiles and an amount of the one or more activity tiles in each of the one or more movable modules;

displaying the customized user interface layout comprising the one or more movable modules on a display of the device based on the presentation of the interaction, the display size of each of the one or more activity tiles, the allowed functionalities within the one or more activity tiles, and the restricted functionalities within the one or more activity tiles; and presenting, in response to a selection of an activity tile of the one or more activity tiles on the customized user interface layout via a gesture input, a secondary user interface.

16. The non-transitory machine-readable medium of claim 15, wherein the configuration module comprises personalization data and ranking data and wherein the retrieving the customized user interface layout uses the personalization data and the ranking data.

17. The non-transitory machine-readable medium of claim 15 wherein the gesture input on the display of the device includes a hand gesture.

18. The non-transitory machine-readable medium of claim 15, wherein the secondary user interface is presented and customized based on the activity tile selected and a user interaction with the mobile application.

19. The non-transitory machine-readable medium of claim 15, wherein the customized user interface layout includes two or more movable modules which allow the customized user interface layout to display activity tiles.

20. The non-transitory machine-readable medium of claim 19, wherein, for each of the two or more movable modules, a subset of the one or more activity tiles is available, and wherein each subset of activity tiles is accessible via at least one of a clicking motion, a facial movement, an eye motion, or a biometric.

\* \* \* \* \*